US009644498B2

(12) United States Patent
Hao et al.

(10) Patent No.: US 9,644,498 B2
(45) Date of Patent: May 9, 2017

(54) SYSTEM AND METHOD FOR REDUCING BACK PRESSURE IN A GAS TURBINE SYSTEM

(71) Applicant: General Electric Company, Schenectady, NY (US)

(72) Inventors: Yongjiang Hao, Shanghai (CN); Wenjie Wu, Shanghai (CN); Bradly Aaron Kippel, Greenville, SC (US); Jianmin Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 13/901,518

(22) Filed: May 23, 2013

(65) Prior Publication Data

US 2014/0230444 A1    Aug. 21, 2014

(30) Foreign Application Priority Data

Feb. 15, 2013    (CN) .................... 2013 2 0089712 U

(51) Int. Cl.
| | | |
|---|---|---|
| *F01D 25/30* | (2006.01) | |
| *F02C 9/18* | (2006.01) | |
| *F02C 6/08* | (2006.01) | |
| *F02C 7/18* | (2006.01) | |

(52) U.S. Cl.
CPC .............. *F01D 25/305* (2013.01); *F02C 6/08* (2013.01); *F02C 7/18* (2013.01); *F02C 9/18* (2013.01); *F05D 2250/11* (2013.01); *F05D 2250/12* (2013.01); *F05D 2250/184* (2013.01); *F05D 2250/75* (2013.01); *F05D 2260/601* (2013.01)

(58) Field of Classification Search
CPC ...... F02C 6/08; F02C 7/18; F02C 9/19; F02K 1/46; F02K 1/28; F01D 25/305
See application file for complete search history.

(56) References Cited

U.S. PATENT DOCUMENTS

| 4,146,986 A | * | 4/1979 | Kohama | ................... F01N 3/22 60/278 |
| 4,171,112 A | * | 10/1979 | Harvey | ..................... B64C 9/38 244/12.5 |
| 4,215,536 A | * | 8/1980 | Rudolph | ................. F02K 1/386 181/213 |

(Continued)

FOREIGN PATENT DOCUMENTS

| CN | 201241751 | 5/2009 |
| EP | 1780381 A2 | 5/2007 |

(Continued)

OTHER PUBLICATIONS

Exair Manufacturing Intelligent Compressed Air Products Since 1983, Exair Corporation, Catalog 25, 2012.

(Continued)

*Primary Examiner* — Phutthiwat Wongwian
*Assistant Examiner* — Marc Amar
(74) *Attorney, Agent, or Firm* — Fletcher Yoder, P.C.

(57) ABSTRACT

In a first embodiment, a system, including an exhaust duct configured to flow an exhaust gas, and an air injection system coupled to the exhaust duct, wherein the air injection system comprises a first air injector configured to inject air into the exhaust duct to assist flow of the exhaust gas through the exhaust duct.

22 Claims, 4 Drawing Sheets

(56) References Cited

U.S. PATENT DOCUMENTS

| | | | | |
|---|---|---|---|---|
| 5,340,271 A * | 8/1994 | Freeman | | F04D 27/0215 415/1 |
| 5,414,992 A * | 5/1995 | Glickstein | | B64D 13/006 60/39.83 |
| 5,787,707 A * | 8/1998 | Hertl | | F01N 3/0835 422/169 |
| 5,934,069 A * | 8/1999 | Hertl | | F01N 3/0835 60/274 |
| 5,974,802 A | 11/1999 | Blake | | |
| 7,069,716 B1 * | 7/2006 | Childers | | F01D 25/305 60/39.5 |
| 8,430,202 B1 * | 4/2013 | Mason | | F01D 17/105 181/210 |
| 2003/0070417 A1 * | 4/2003 | Plumpe, Jr. | | F02K 1/002 60/230 |
| 2006/0242942 A1 * | 11/2006 | Johnson | | B64C 15/02 60/228 |
| 2007/0125092 A1 * | 6/2007 | Wolfe | | F01D 17/105 60/782 |
| 2010/0205967 A1 | 8/2010 | Gopalkrishna et al. | | |
| 2011/0036066 A1 * | 2/2011 | Zhang | | F01D 25/305 60/39.5 |
| 2011/0058939 A1 | 3/2011 | Orosa et al. | | |
| 2011/0146274 A1 * | 6/2011 | Shimizu | | B01D 46/0005 60/611 |
| 2012/0186261 A1 * | 7/2012 | Toprani | | F01D 9/065 60/772 |
| 2013/0001009 A1 * | 1/2013 | Francisco | | F02K 1/46 181/228 |
| 2015/0089955 A1 * | 4/2015 | Knapp | | F02C 6/08 60/782 |

FOREIGN PATENT DOCUMENTS

| | | |
|---|---|---|
| GB | 2451261 A | 7/2007 |
| KR | 20070108158 | 10/2007 |

OTHER PUBLICATIONS

Exair Air Knifes, an Intelligent Compressed Air Product, Exair Corporation, 2011.

* cited by examiner

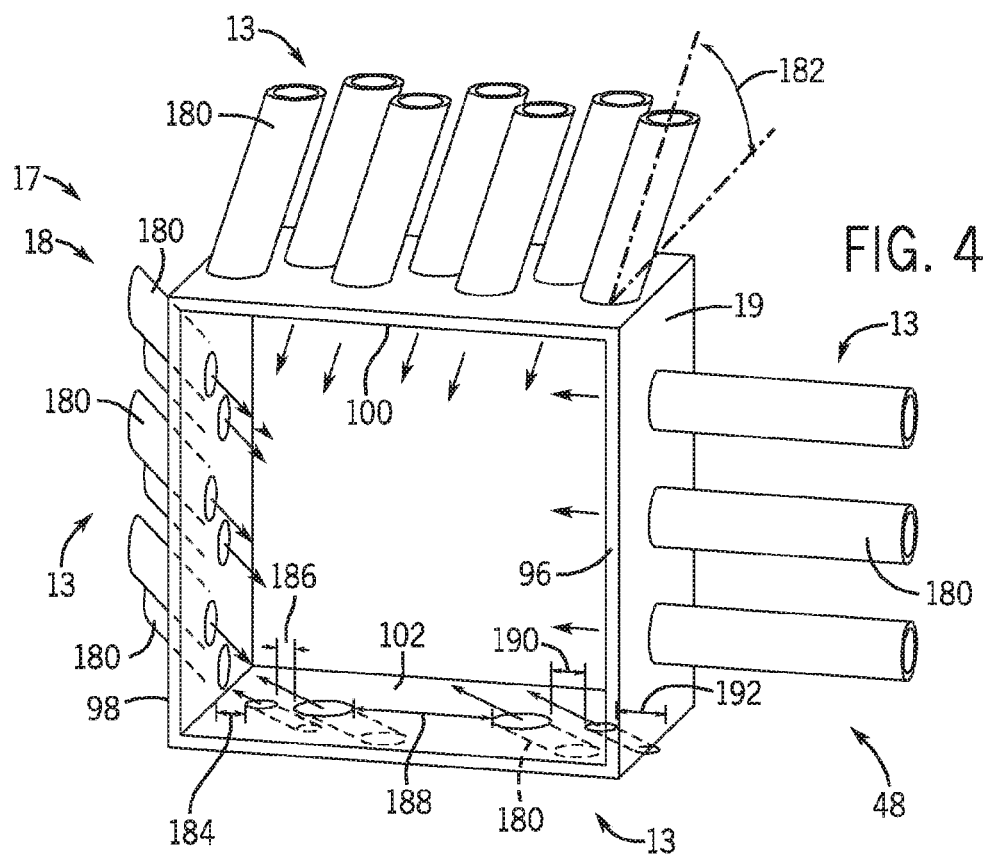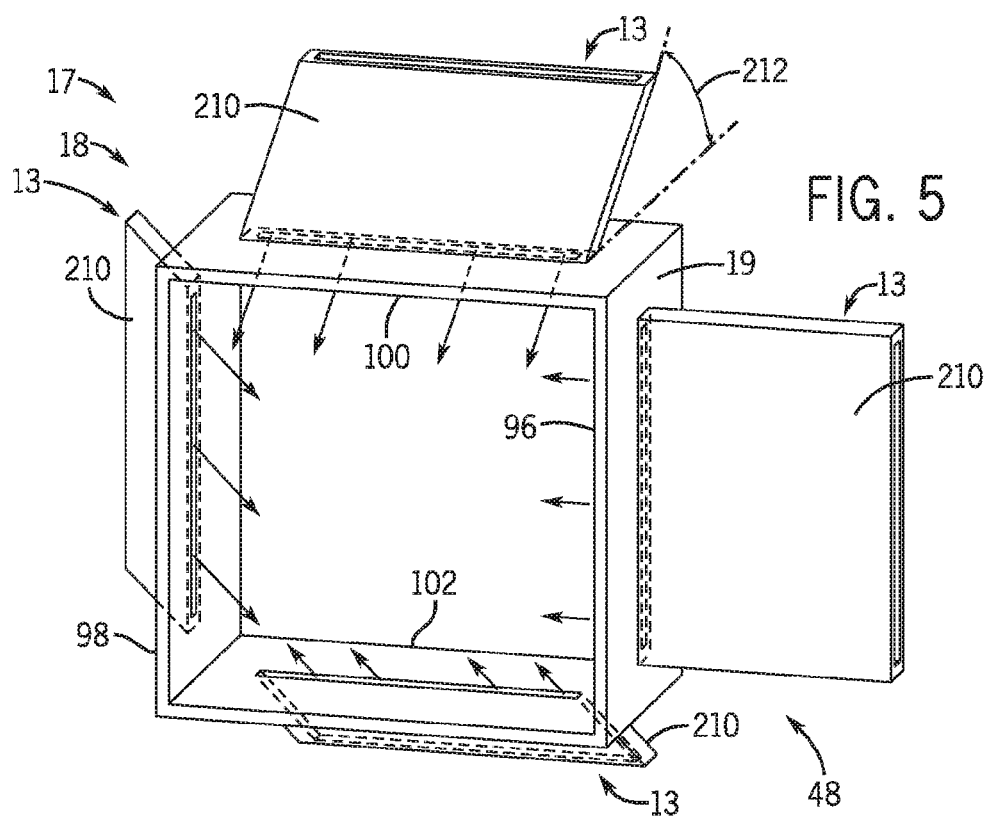

SYSTEM AND METHOD FOR REDUCING BACK PRESSURE IN A GAS TURBINE SYSTEM

CROSS-REFERENCE TO RELATED APPLICATION

This application claims priority to and benefit of Chinese Patent Application No. 201320089712.6, entitled "SYSTEM AND METHOD FOR REDUCING BACK PRESSURE IN A GAS TURBINE SYSTEM", filed Feb. 15, 2013, which is herein incorporated by reference in its entirety.

BACKGROUND OF THE INVENTION

The subject matter disclosed herein relates to gas turbine systems and, more specifically, a system for reducing back pressure on the turbine.

Gas turbine engine systems benefit from improved efficiency. Gas turbine designs minimize inefficiencies in order to extract as much work as possible from a combustible fuel. Specifically, the gas turbine system uses the combustible fuel to create hot, pressurized exhaust gases that flow through a turbine. The turbine uses the momentum of the exhaust gases to create rotational energy for use by a load (e.g., a generator). As the exhaust gases exit the turbine into an exhaust section, they may create undesirable back pressure. The back pressure may reduce the gas turbine system's efficiency, causing the system to use more energy to move the exhaust gases out of the turbine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system, including an exhaust duct configured to flow an exhaust gas, and an air injection system coupled to the exhaust duct, wherein the air injection system comprises a first air injector configured to inject air into the exhaust duct to assist flow of the exhaust gas through the exhaust duct.

In a second embodiment, a system including, a controller having instructions to control air flow through an air injection system into an exhaust duct to reduce back pressure associated with flow of the exhaust gas through the exhaust duct.

In a third embodiment, a method including, receiving the air flow from a compressor of a gas turbine engine, routing the air flow through the air injection system into the exhaust duct downstream of a turbine of the gas turbine engine, and reducing the back pressure with the air flow.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a cross-sectional perspective view of the exhaust duct along line 4-4 in FIG. 1 that illustrates an air injector stage with air injector nozzles;

FIG. 5 is a cross-sectional perspective view of the exhaust duct along line 4-4 in FIG. 1 that illustrates an air injector stage with air blades;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards a gas turbine system with an air injection system that reduces back pressure on a gas turbine. Specifically, the air injection system helps move back-pressure-causing-exhaust gases away from the gas turbine engine. This improves efficiency by reducing the work used by the gas turbine engine to expel exhaust gases. In certain embodiments, the air injection system includes multiple air injector stages that move the exhaust gas away from the gas turbine engine. Each injector stage may include one or more air injectors. The air injectors may include air blades or air injector nozzles. The injectors or air blades are designed to minimize air blockage and maximize air energization. In operation, the air injectors and air nozzles entrain surrounding and/or upstream air that is then energized with a small amount of compressed air. In this manner, the air injectors and air blades can move large volumes of air at high velocities. These air blades and nozzles may be modified in various ways to include changing their shape; the angle at which they inject air; sizes; quantity; and spacing between the duct and neighboring air injectors. Furthermore, the air injectors may interact in different ways with the exhaust duct. For example, some air injectors may project into the exhaust duct while others are flush or recessed with exhaust duct walls.

Figure 1:
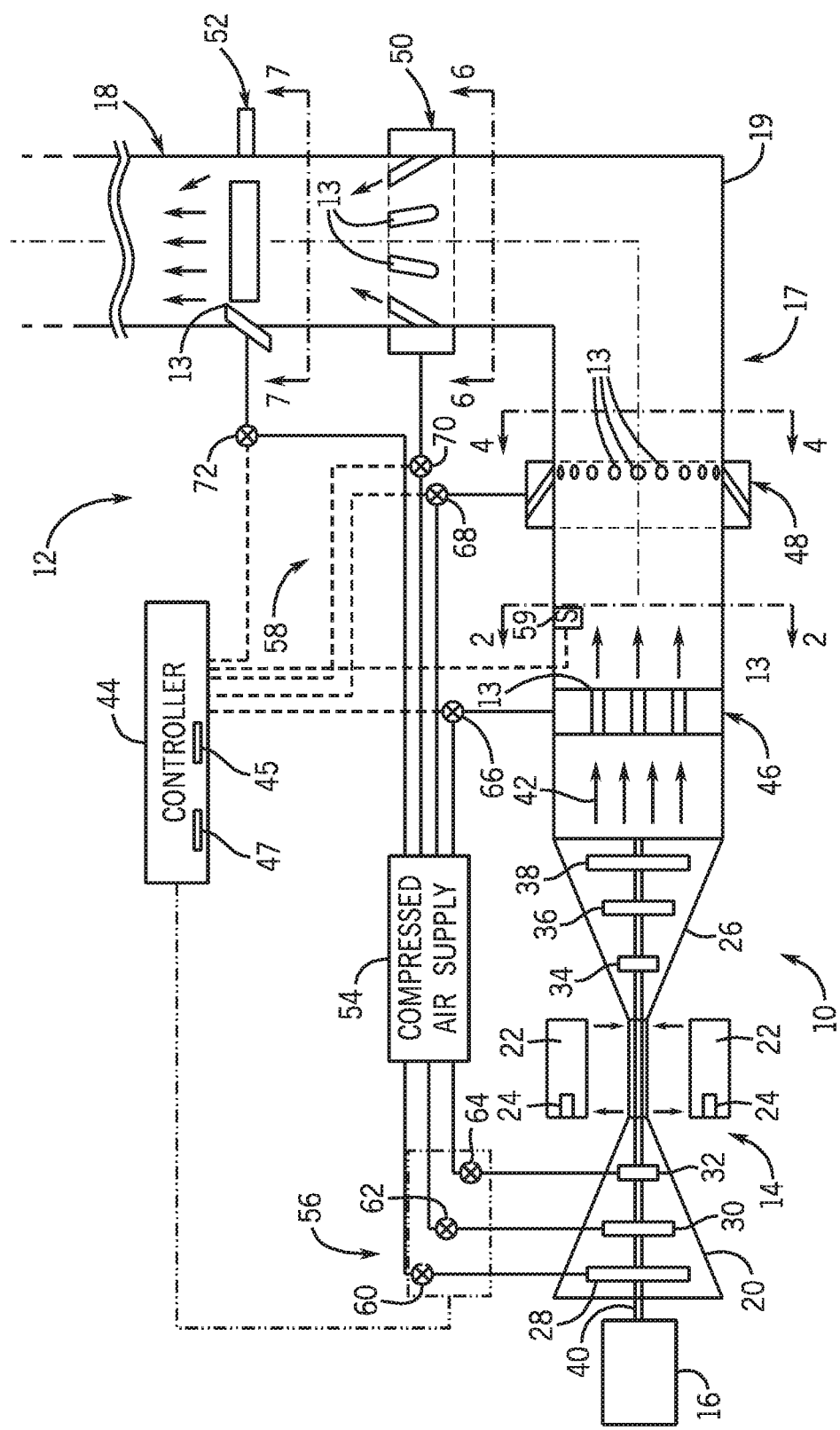
FIG. 1 is a schematic of a gas turbine system using an air injection system.

FIG. 1 is a schematic of a gas turbine system 10 using an air injection system 12. The gas turbine system 10 includes the air injection system 12, a gas turbine 14, a load 16, and exhaust duct work 17 with an exhaust stack 18. The air injection system 12 may advantageously improve the efficiency of the gas turbine system 10. Specifically, the air injection system 12 may move excess compressed air from the gas turbine 14 to the exhaust duct 17 (including the exhaust stack 18) to reduce back pressure on the gas turbine 14. The air injector system 12 may include one or more air injector stages 46, 48, 50, and 52 (or modules) that are mountable in or part of the exhaust duct work 17, each having one or more air injectors 13. Each injector 13 injects air to help flow the exhaust gases in a downstream direction to reduce back pressure.

The gas turbine engine 14 includes a compressor 20, combustor 22, fuel nozzle 24, and turbine 26. In operation, the compressor 20 draws air into the gas turbine 14 and compresses it for combustion. As illustrated, the compressor 20 includes multiple rotors or compression stages 28, 30, and 32 each having a plurality of compressor blades. While only three rotors or stages are shown, a compressor 20 may include additional rotors or stages (e.g., 1, 2, 3, 4, 5, 6, 10, or more). Each stage 28, 30, and 32 uses the blades to progressively compress the air to a greater pressure. After passing through the compressor 20, the air enters the combustor 22. In the combustor 22, the air combines and combusts with fuel from the fuel nozzle 24. The combustion of the air and fuel creates hot pressurized combustion gas that then travel through the turbine 26.

The turbine 26, like the compressor 20, includes several rotors or turbine stages 34, 36, and 38, each having a plurality of turbine blades. While only three rotors or stages are shown, a turbine 26 may include additional rotors or stages (e.g., 1, 2, 3, 4, 5, 6, 10, or more). The movement of the combustion gases through the turbine 26, causes the turbine blades and rotors to rotate. The rotation of the rotors or turbine stages 34, 36, and 38 cause shaft 40 to rotate, which then drives a load 16 (e.g., a generator). As the hot and fast moving combustion gases pass sequentially through the turbine stages 34, 36, and 38, the gases restricts exhaust gas 42 due to the stations walls 19, turns and general flow restriction, thereby collecting back pressure on the flow of exhaust gases 42 progressively expand, cool, and slow before entering the exhaust stack 18 as slower moving exhaust gas 42. The exhaust duct 17 generally conforms or the flow of exhaust gas 42, and generally slows the flow of traveling through the turbine 26. The back pressure causes the gas turbine 14 to work harder and burn more fuel to counter the back pressure. Advantageously, the gas turbine system 10 may include an air injection system 12 that reduces the back pressure and increases efficiency. In particular, the air injectors system 12 is configured to energize or add momentum to the flow of exhaust gas to counter the effects of the flow restriction.

The air injection system 12 includes a controller 44; air injector modules or stages 46, 48, 50, and 52; compressed air supply 54; pressure collecting valve assembly 56; pressure releasing valve assembly 58; and sensor 59. Advantageously, the air injection system 12 may use compressed air from the gas turbine 14 to reduce the back pressure caused by the exhaust gas 42. As explained above, the compressor 20 compresses air for combustion in the combustor 22. The compressor 20 may create more pressurized air than the gas turbine 14 can use during combustion. Instead of wasting this excess pressurized air, the air injection system 12 uses the pressurized air in the air injector stages 46, 48, 50, and 52 to reduce back pressure.

The air injection system 12 uses the valve assemblies 56 and 58 to control the flow of the compressed air from the compressor 20 into the air injector stages 46, 48, 50, and 52. The controller 44 includes a processor 45, memory 47, and instructions stored on the memory 47 executable by the processor 45. The controller 44 operates with and receives data from the sensor 59 (e.g., exhaust gas velocity, pressure in exhaust duct 17). The controller then processes this data with the processor 45 and executes instructions stored in the memory 47. While only one sensor 59 is illustrated other embodiments may include multiple sensors measuring properties at different locations in the exhaust duct 17. In operation the controller 44 executes instructions to open and close the valves 60, 62, and 64 in the valve assembly 56 to selectively flow excess pressurized air from respective compressor stages 28, 30, and 32 into the compressed air supply 54. While only three valves are illustrated, more valves in different configurations are possible. For example, the valve assembly 56 may include (1, 2, 3, 4, 5, 10, 15 or more valves). In some embodiments, each valve may control pressurized air release from a respective compression stage in the compressor 20. In other embodiments, a single valve may control pressurized air release from a single stage, all stages, or some of the stages. In still other embodiments, valves may only connect to some of the stages (e.g., the stages with the most pressure or suitable pressure for the exhaust duct 17).

The compressed air supply 54 may include an air distribution manifold, storage tank, conduits, or any combination thereof. In certain embodiments, the supply 54 may simply represent, or include the source of compressed air, i.e., the compressor 20 itself. The valve assembly 56 receives the compressed air from the supply 54 and routes it to the air injector stages 46, 48, 50, and 52. The valve assembly 58 includes valves 66, 68, 70, and 72. Each valve corresponds to a respective air injector stage 46, 48, 50, and 52. In other embodiments there may be more air injector stages (e.g., 1, 2, 3, 4, 6, 8, 14, or more) and a corresponding number of valves (e.g., 1, 2, 3, 4, 6, 8, 14, or more). In still other embodiments, there may be fewer valves than the number of air injector stages (e.g., one valve for all of the air injectors). In operation, the controller 44 executes instructions to open and close valves 66, 68, 70, and 72 to provide compressed air into the respective air injector stages 46, 48, 50, and 52. The air injector stages 46, 48, 50, and 52 then direct the compressed air into air injectors 13. The air injectors 13 use the compressed air to increase the speed or momentum of the exhaust gas 42 as it travels though the exhaust duct 17 (including exhaust stack 18), reducing back pressure on the gas turbine 14. The controller 44 executes instructions to selectively control the valves to adjust the quantity flow rate, and distribution among the various stages and injectors 13. For example, the controller 44 may execute instructions to progressively increase exhaust gas speed between the stages 46, 48, 50, and 52 by increasing the amount of compressed air in each stage. In other embodiments, the controller 44 may execute instructions to increase the speed of the exhaust gas 42 in the stage closest to the turbine 26 (e.g., stage 46) and then progressively reduce compressed air injection into the later stages 48, 50, and 52. In each configuration the injectors 13 in each stage 46, 48, 50, and 52 (or module) helps to energize the exhaust flow to counteract the flow restriction as the exhaust gas 42 travels through the exhaust duct. Furthermore, each stage 46, 48, 50, and 52 (or module)

may energize/interact with the flow in different ways. For example, the stages 46, 48, 50, and 52 (or module) may have air injectors 13 that protrude into the flow, are flush with the exhaust duct 17, or are angled with respect to the flow. By projecting into the flow the air injector 13 may more effectively energize the center of the flow. In contrast, the injectors 13 that are flush with the exhaust duct 17 may more effectively energize the outer portions of the flow. Furthermore, the angle of the air injectors 13 with respect to the flow may more effectively energize the flow in a direction out of the exhaust duct 17. Thus depending on the embodiment a stage 46, 48, 50, and 52 (or module) may adjust how the air injector(s) 13 interact with the flow (i.e., energize the flow center, flow edges, or the direction of flow movement).

Figure 2:
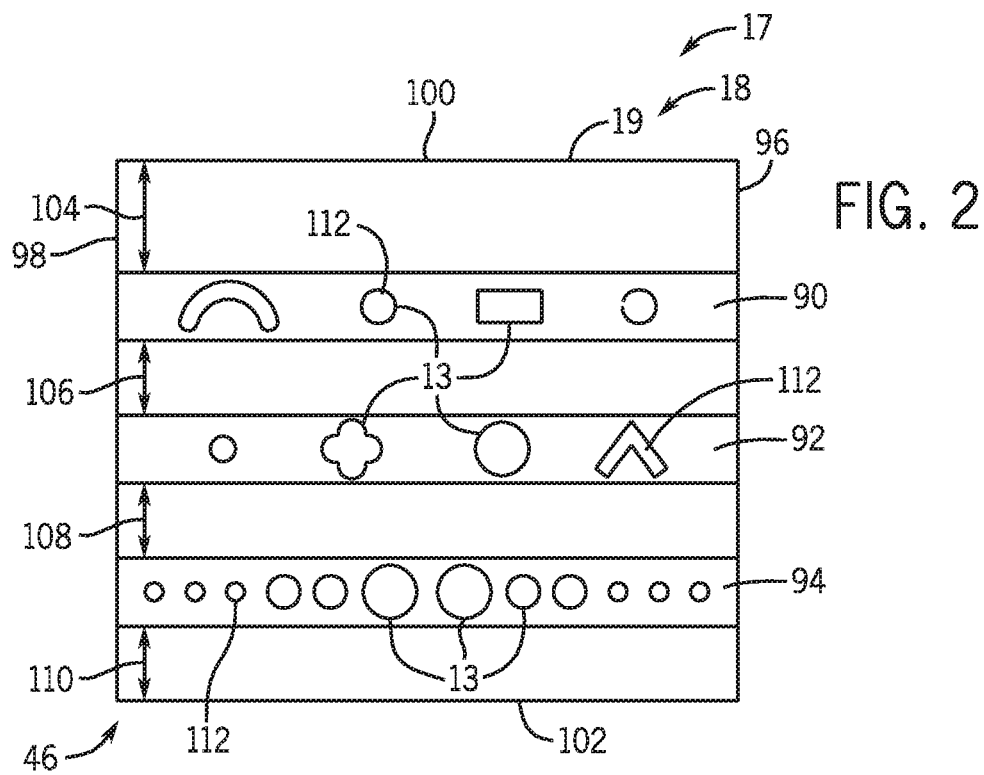
FIG. 2 is a cross-sectional view of an exhaust duct along line 2-2 in FIG. 1 that illustrates an air injector stage with rakes.

FIG. 2 is a cross-sectional view of the exhaust duct 17 along line 2-2 in FIG. 1, illustrating an embodiment of the air injector stage 46 with rakes 90, 92, and 94. While only three rakes are shown, there may be more rakes depending on the embodiment (e.g., 1, 2, 3, 4, 5, 10, 15, or more). As illustrated, the exhaust duct 17 is rectangular with four side walls 96, 98, 100, and 102. In other embodiments, the exhaust duct 17 may be circular, square, oval, hexagonal, etc. In the present embodiment, the rakes 90, 92, and 94 are between the side walls 96 and 98 and spaced apart by distances 104, 106, 108, and 110. The distances 104, 106, 108, and 110 may change, depending on the embodiment, to achieve particular flow characteristics. For example, the distances 104 and 110 may be small in order to place the rakes 90 and 94 near the side walls 100 and 102. In other embodiments, the rakes 90, 92, and 94 may be spaced closer together. The rakes 90, 92, and 94 may also have different orientations to include vertical orientations between the walls 100 and 102. In still other embodiments, the rakes may be oriented diagonally between the walls 96, 98, 100, and 102.

The rakes 90, 92, and 94 include one or more air injectors 13, e.g., air injector nozzles 112. Each rake 90, 92, and 94 may include one or more nozzles 112 (e.g., 1, 2, 3, 4, 5, 10, 25, or more). In some embodiments, the number of nozzles 112 may differ between rakes 90, 92, and 94. For example, rake 94 may have twelve nozzles 112 while rakes 90 and 92 have four each. The nozzles 112 may also differ in shape and size with respect to each other. Shapes may include circular, chevron, rectangular, square, half-moon, and ellipse, among others. In other embodiments, the nozzles 112 may progressively change in size across the rake to improve flow velocity characteristics of the exhaust gas between the side walls 96, 98, 100, and 102 of the exhaust duct 17. For example, smaller nozzles 112 that emit pressurized air at a high velocity may be closer to the sides of the exhaust duct 17 where the flow may be slowest, while lower pressure nozzles 112 are near the center of the exhaust duct 17. In still other embodiments, the spacing and sizes of the nozzles 112 may be equal. This may improve exhaust gas 42 flow through the exhaust duct 17. Moreover, there are many possible combinations using the variables of nozzle size, nozzle shape, nozzle number, nozzle spacing, and rake spacing.

Figure 3:
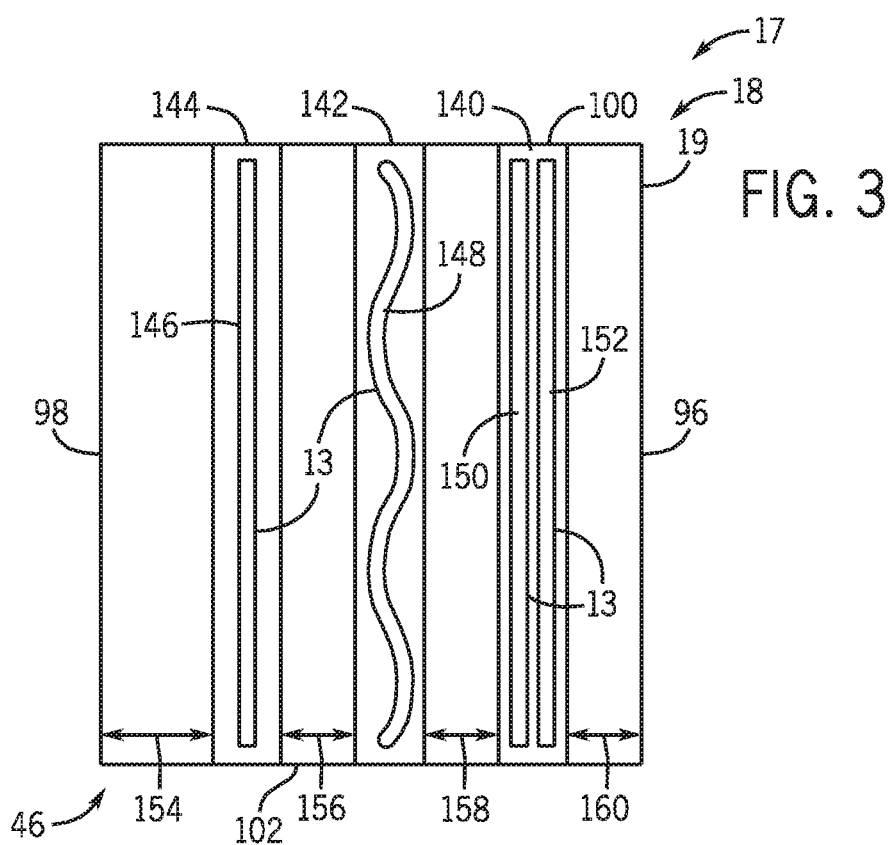
FIG. 3 is a cross-sectional view of the exhaust duct along line 2-2 in FIG. 1 that illustrates an air injector stage with rakes.

FIG. 3 is a cross-sectional view of the exhaust duct 17 along line 2-2 in FIG. 1, illustrating the air injector stage 46 with rakes 140, 142, and 144. The rakes 140, 142, and 144 include air blade slots 146, 148, 150, and 152. The air blades 146, 148, and 150 function like the air nozzles 112 in FIG. 2, and provide air to energize or push exhaust gases 42 through the exhaust duct 17. Furthermore, the air blades 146 may more uniformly energize the flow. In the present embodiment, the rakes 140, 142, and 144 extend between the side walls 100 and 102 in a vertical orientation. The rakes 140, 142, and 144 may change orientation (e.g., horizontal, diagonal), and change distances 154, 156, 158, and 160 between each other and the side walls 96, 98, 100, and 102, depending on the embodiment. Furthermore, the rakes 140, 142, and 144 may include more than one air blade. As illustrated rake 140 includes two air blades 150 and 152, while rakes 142 and 144 have one air blade 146 and 148, respectively. Different embodiments may include more air blades in each rake (e.g., 1, 2, 3, 4, 5, 6, or more), or different numbers of rakes (e.g., 1, 2, 3, 4, 5, 6, or more). For example, rake 140 may have two blades while rake 144 has five and rake 142 has three. Finally, the shape of the air blade may differ (e.g., straight, wave-like, zigzag, etc.). For example, the blade 148 forms a wave-like slot, while the remaining blades 146, 150, and 152 form a straight rectangular slot.

FIG. 4 is a cross-sectional view of the exhaust duct 17 along line 4-4 in FIG. 1, illustrating the air injector stage 48 with air injector nozzles 180. As illustrated, the nozzles 180 are flush with the side walls 96, 98, 100, and 102. Accordingly, the air injector nozzles 180 may impact the portions of the flow closest to the side walls 96, 98, 100, and 102. The air injector stage 48 may form various configurations with the air nozzles 180 using the variables of shape, angle, size, quantity, and spacing. For example, the side walls 96, 98, 100, and 102 may have the same or different numbers (e.g., 1, 2, 3, 4, 5, 6, 7, 8, 9, or 10) of nozzles 180. For example, side wall 96 may have three nozzles 180, while the remaining walls 98, 100, and 102 have six, seven, and four nozzles 180, respectively). Each of these nozzles 180 may form a variety of shapes, such as circular, chevron, rectangular, square, half-moon, and ellipse among others. Furthermore, the air injector stage 48 may place differently shaped nozzles 180 at different locations (e.g., on some or all of the side walls 96, 98, 100, and 102).

The air nozzles 180 may also form an angle 182 with respect to the side walls 96, 98, 100, and 102 in the direction of the exhaust gas flow. The angle of the air nozzles 180 may change how they energize the flow (i.e., smaller angles may energize flow in a direction parallel to the exhaust duct 17 while a large angle will increasingly energize the flow in a direction perpendicular to the exhaust duct 17). The angle 182 may be any angle between approximately 0 and 90 degrees (e.g., approximately 10-30, 20-70, 45-65 degrees). For example, the angle 182 may be approximately 18, 20, or 30 degrees. In some embodiments, the air nozzles 180 on the side wall 96 may form an angle of approximately 90 degrees, while the air nozzles 180 on side wall 100 are at approximately 45 degrees. In still other embodiments, each of the air nozzles 180 may form an angle 182 that differs from the others.

As discussed above, the air nozzles 180 may form different sizes and be spaced differently with respect to each other. As illustrated, the side wall 102 includes different sizes of air nozzles 180. The different sizes of the air nozzles 180 may increase or decrease air flow in portions of the air injector stage that optimize the flow of the exhaust gas 42. The air nozzles 180 on the side wall 102 are spaced apart by distances 184, 186, 188, 190, and 192. The spacing between the air nozzles 180 may change the profile of the exhaust gas 42 flow through the air injector stage 48. For example, the air injectors 180 may provide greater air flow near the side walls 96 and 98 by decreasing the distances 184, 186, 190, and 192 and increasing the distance 188, thereby providing greater energization of the exhaust gas 42 flow along the side walls 96 and 98. In other embodiments, the opposite may occur by decreasing distance 188 and increasing distances 184, 186, 190, and 192.

FIG. 5 is a cross-sectional perspective view of the exhaust duct 17 along line 4-4 in FIG. 1, illustrating the air injector stage 48 with air blades 210. The blades 210 like the nozzles in FIG. 4 move exhaust gas 42 through the exhaust duct 17. The air blades 210 like the nozzles in FIG. 4 are flush with the exhaust duct 17 and will therefore impact the portions of the flow closest to the side walls 96, 98, 100, and 102. The air blades 210 may form various configurations by changing the shape, angle, and quantity. The air blades 210 may form different shapes, including wave-like, zigzag, and straight rectangular slots. The air blades 210 may project from side walls 96, 98, 100, and 102. This angle 212 may be any angle between approximately 0 and 90 degrees (e.g., approximately 10-30, 20-70, or 45-65 degrees). For example, the angle 212 may be approximately 10, 20, or 30 degrees. In certain embodiments, one of the air blades 210 may have an angle 212 of approximately 90 degrees with the side wall 96, while the other air blades 210 have an angle 212 of approximately 30 degrees with respective side walls 98, 100, and 102. In still other embodiments, each of the air blades 210 may form an angle 212 that differs from the others. Furthermore, each side wall 96, 98, 100, and 102 may include more than one air blade 210 or some walls may have no air blades 210.

Figure 6:
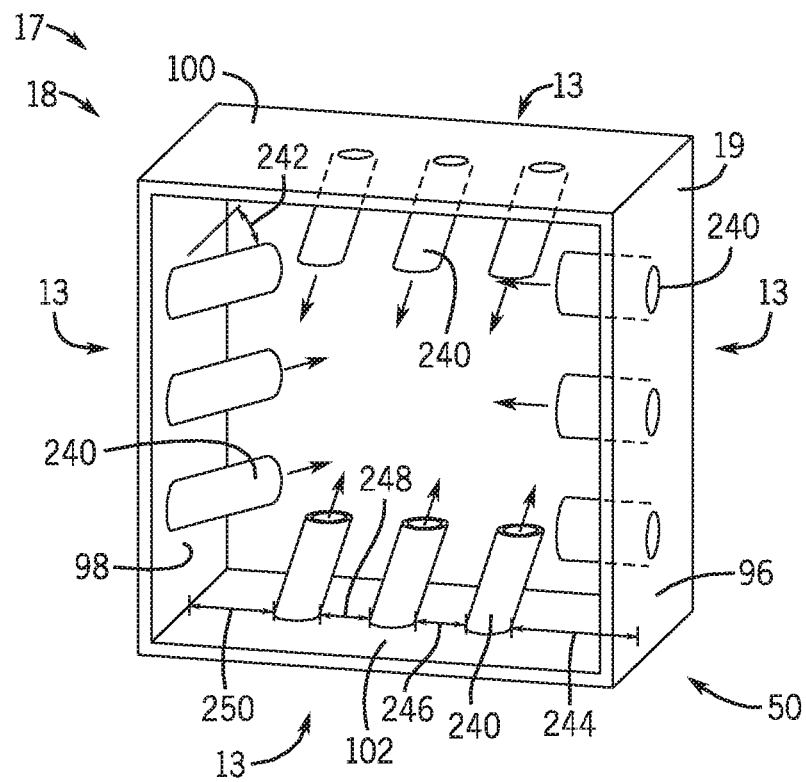
FIG. 6 is a cross-sectional perspective view of the exhaust duct along line 6-6 in FIG. 1 that illustrates an air injector stage with air injector nozzles.

FIG. 6 is a cross-sectional perspective view of the exhaust duct 17 along line 6-6 in FIG. 1, illustrating the air injector stage 50 with air injector nozzles 240. As illustrated, the nozzles 240 project from the side walls 96, 98, 100, and 102. In other embodiments, air blades instead of the nozzles 240 may project from the side walls 96, 98, 100, and 102. By projecting into the flow the air nozzles 240 (or air blades) may more effectively energize the center of the flow.

The air injector stage 50 may form various configurations with the air nozzles 240 using the variables of shapes, angles, sizing, quantity, and spacing. For example, the side walls 96, 98, 100, and 102 may have the same or different numbers (e.g., 1, 2, 3, 4, 5, 6, 7, 8, 9, or 10) of nozzles 240 on each wall. For example, side wall 96 may have three nozzles 240, while the remaining walls 98, 100, and 102 have four, five, and six nozzles 240 respectively. In some embodiments, some walls may exclude nozzles 240. Each of these nozzles 240 may form a variety of shapes to include circular, chevron, rectangular, square, half-moon, and ellipse shaped nozzles, among others. Furthermore, the air injector stage 50 may place differently shaped nozzles 240 at different locations (e.g., on different side walls 96, 98, 100, and 102).

The air nozzles 240 may also form an angle 242 with respect to the side walls 96, 98, 100, and 102 in the downstream direction of the exhaust gas flow. The angle of the air nozzles 240 may change how they energize the flow (i.e., smaller angles may energize flow in a direction parallel to the exhaust duct 17 while a large angle will increasingly energize the flow in a direction perpendicular to the exhaust duct 17). The angle 242 may be any angle between approximately 0 and 90 degrees (e.g., approximately 10-30, 20-70, or 45-65 degrees). For example, each nozzle 240 may have an angle 242 of approximately 10, 20, or 30 degrees. In some embodiments, the air nozzles 240 that connect to side wall 96 may form an angle of approximately 90 degrees, while the air nozzles 240 that connect to side wall 98 are at approximately 45 degrees. In still other embodiments, each of the air nozzles 240 may form an angle 242 that differs from the others.

As discussed above, the air injector stage 50 may change spacing and sizing between nozzles 240. The different sizing of air nozzles 240 may increase or decrease air flow in portions of the air injector stage 50 to optimize the flow of the exhaust gas 42. The air nozzles 240 may also change spacing with respect to each other. For example, the nozzles 240 are spaced from one another by distances 244, 246, 248, and 250. The spacing between the air nozzles 240, like the size of the air nozzles 240, may change how the exhaust gas 42 accelerates through the air injector stage 50. For example, changing the distances 244, 246, 248, and 250 may move the nozzles 240 closer to side walls 96 and 98, accelerating the exhaust gas near the opposite edges of side wall 102. In other embodiments, the opposite may occur by decreasing distances 244, 246, 248, and 250 the nozzles 240 may accelerate the exhaust gas 42 flow near the exhaust duct 18 center.

Figure 7:
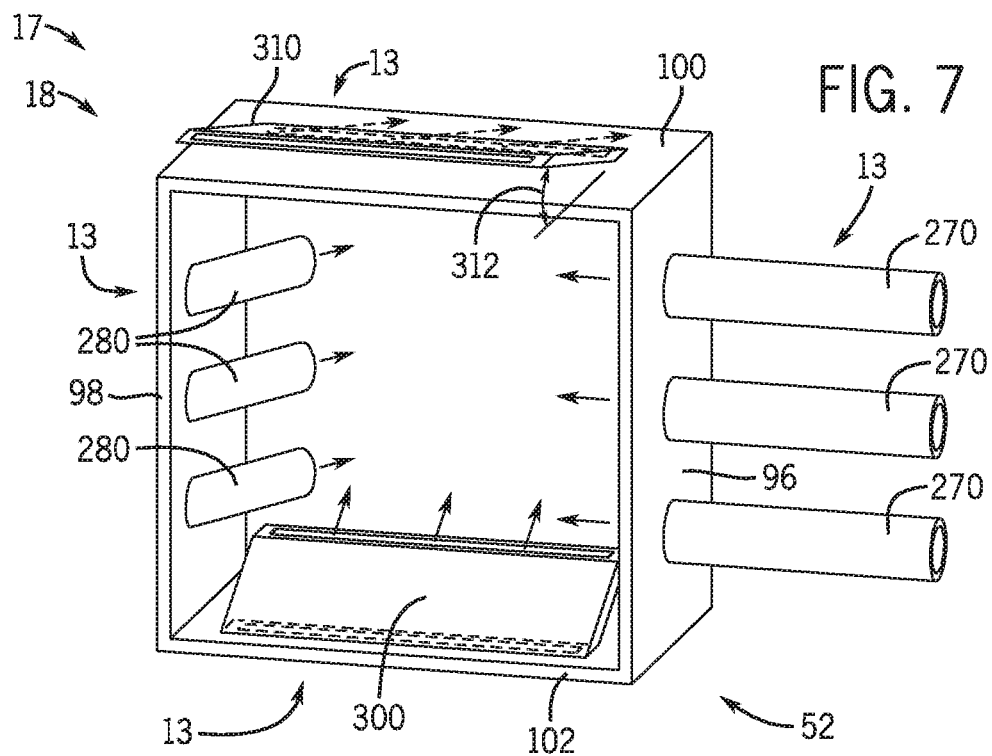
FIG. 7 is a cross-sectional perspective view of the exhaust duct 18 along line 7-7 in FIG. 1 that illustrates the air injector stage with air injector nozzles and air blades.

FIG. 7 is a cross-sectional perspective view of the exhaust duct 18 along line 7-7 in FIG. 1, illustrating the air injector stage 52 with air injector nozzles 270 and 280 and air blades 300 and 310. The embodiment shown in FIG. 7 combines the different air nozzles and air blades from the previous embodiments in FIGS. 2-6 into the air injector stage 52. Specifically, the air injector stage 52 includes nozzles 270 that are flush with the wall 96, nozzles 280 that project from the side wall 98 into the duct 17, air blade 300 that projects from the wall 102 into the duct 17, and the air blade 310 that is flush with the wall 100. While FIG. 7 illustrates one possible configuration, many others are possible. For example, some walls may include combinations of air blades and air nozzles that are flush recessed, or projecting relative to the exhaust duct 17. In still other embodiments, different walls may combine projecting air nozzles 280 with flush nozzles 270 on all the walls 96, 98, 100, and 102, or an embodiment that combines projecting air blades 300 and flush air blades 310. Furthermore, the air injector stage 52 may further modify the air nozzles 270 and 280 and air blades 300 and 310 in FIG. 7 using the variables discussed above in FIGS. 2-6, including changing shapes, angle 312, sizing, quantity, and spacing.

Technical effects of the invention include the ability to reduce back pressure on a gas turbine system using excess compressed air from the compressor. Specifically, the disclosed embodiments reduce back pressure on a gas turbine engine with air injector stages along an exhaust duct. The air injector stages include air injectors that use the excess compressed air to accelerate the exhaust gases out of the system. In this manner, the system reduces back pressure on the gas turbine engine improving its efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A power plant system, comprising:
a power plant exhaust stack having an exhaust duct configured to flow an exhaust gas; and
an air injection system coupled to the exhaust duct, wherein the air injection system comprises:

a sensor configured to sense a pressure condition indicative of a back pressure associated with a flow of the exhaust gas through the exhaust duct;
a controller having instructions to receive, from the sensor, pressure data relating to the back pressure, and to control the air injection system, based at least in part on the pressure data, to reduce the back pressure; and
a first air injector configured to, upon instruction from the controller, inject air into the exhaust duct to assist the flow of the exhaust gas through the exhaust duct.

2. The power plant system of claim 1, comprising an exhaust duct module having the air injection system coupled to the exhaust duct, wherein the air injection system comprises a plurality of air injectors including the first air injector.

3. The power plant system of claim 1, comprising a compressor configured to supply at least a first portion of compressed air to the air injection system such that the first air injector of the air injector system injects compressed air into the exhaust duct to assist the flow of the exhaust gas through the exhaust duct.

4. The power plant system of claim 3, comprising a turbine engine that expels the exhaust gas into the exhaust duct.

5. The power plant system of claim 4, comprising a combustor fluidly coupled with, and between, the compressor and the turbine, wherein the combustor receives a second portion of the compressed air from the compressor, wherein the combustor combusts a fuel together with the second portion of the compressed air to generate the exhaust gas, and wherein the turbine receives the exhaust gas from the combustor.

6. The power plant system of claim 1, wherein the air injection system comprises a second air injector, wherein the first and second air injectors have different sizes, different shapes, different depths into the exhaust duct, or a combination thereof.

7. The power plant system of claim 1, wherein the first air injector comprises an air blade.

8. The power plant system of claim 1, wherein the first air injector comprises an air nozzle.

9. The power plant system of claim 1, wherein the air injection system comprises a rake disposed in the exhaust duct, and the rake comprises the first air injector.

10. The power plant system of claim 1, wherein the air injection system comprises a plurality of rakes disposed in the exhaust duct, and at least one rake of the plurality of rakes comprises a plurality of air injectors having the first air injector.

11. The power plant system of claim 1, wherein the first air injector is generally flush with an inner surface of the exhaust duct.

12. The power plant system of claim 1, wherein the first air injector protrudes into the exhaust duct.

13. The power plant system of claim 1, wherein the air injection system comprises a first injection stage having the first air injector and a second injection stage having a second air injector, wherein the first and second injection stage are disposed at different axial positions along the exhaust duct.

14. The power plant system of claim 1, wherein the air injection system comprises a controller having instructions to control air flow through the air injection system into the exhaust duct to reduce back pressure associated with flow of the exhaust gas through the exhaust duct.

15. The power plant system of claim 1, wherein an angle of the first air injector with respect to the flow of the exhaust gas, and the corresponding downstream direction, is adjustable.

16. A land-based system comprising: a controller having instructions to: receive, from a sensor, pressure data relating to a back pressure associated with a flow of exhaust gas through an exhaust duct of an exhaust stack of a power plant; control, based at least in part on the pressure data, an air flow through an air injection system into the exhaust duct to reduce the back pressure associated with the flow of the exhaust gas through the exhaust duct, wherein the air flow is directed into the exhaust duct in a downstream direction, and the downstream direction of the air flow causes the air flow to energize the flow of the exhaust gas through the exhaust duct.

17. The land-based system of claim 16, wherein the controller has instructions to control the air flow from a compressor of a gas turbine engine to the exhaust duct downstream of a turbine of the gas turbine engine.

18. The land-based system of claim 17, comprising the gas turbine engine.

19. The land-based system of claim 17, comprising:
the exhaust duct having the air injection system; and
the sensor.

20. The land-based system of claim 16, wherein the controller has instructions to control a plurality of stages of the air injection system.

21. A method, comprising: sensing, via a sensor disposed within an exhaust duct of an exhaust stack of a power plant, a pressure condition indicative of a back pressure associated with a flow of an exhaust gas through the exhaust duct; communicating pressure data associated with the back pressure from the sensor to a controller; and controlling, via the controller and based at least in part on the pressure data, an air flow through an air injection system into the exhaust duct to reduce the back pressure; and directing the air flow into the exhaust duct in a downstream direction, wherein the downstream direction of the air flow causes the air flow to energize the flow of the exhaust gas through the exhaust duct.

22. The method of claim 21, comprising:
receiving the air flow from a compressor of a gas turbine engine;
routing the air flow through the air injection system into the exhaust duct downstream of a turbine of the gas turbine engine; and
reducing the back pressure with the air flow.

* * * * *